Figure 6:
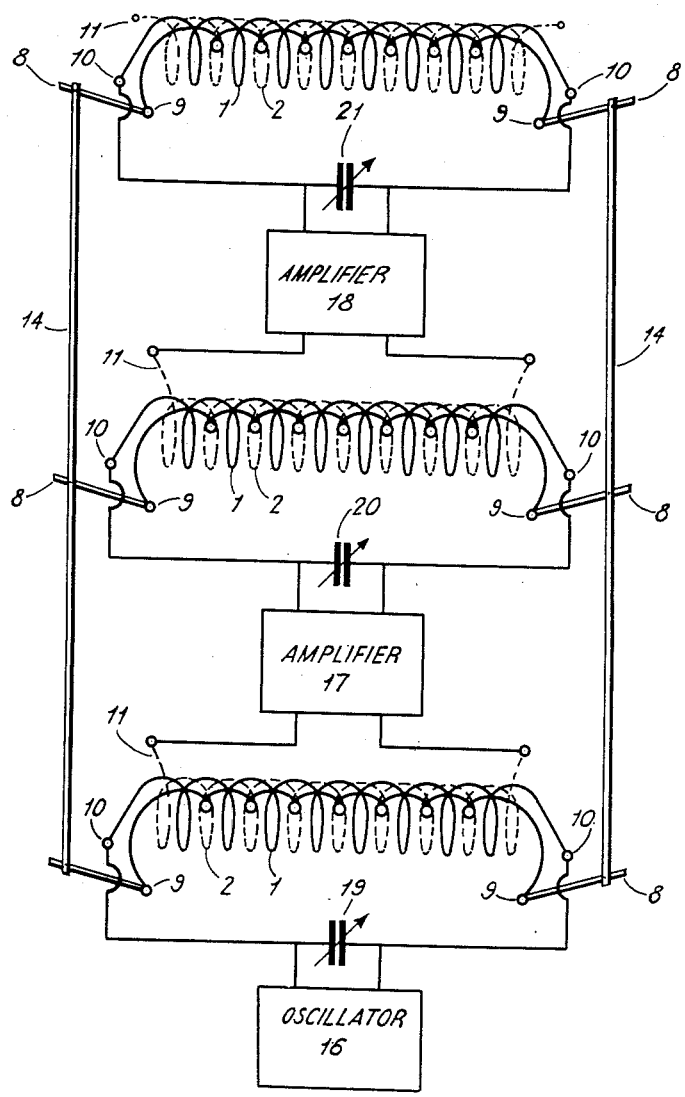

March 17, 1936.   R. VILLEM ET AL   2,034,012
RADIOELECTRIC TRANSMITTER AND RECEIVER SYSTEM
WITH CHANGEABLE WAVE LENGTH RANGE
Filed June 3, 1932   2 Sheets-Sheet 1
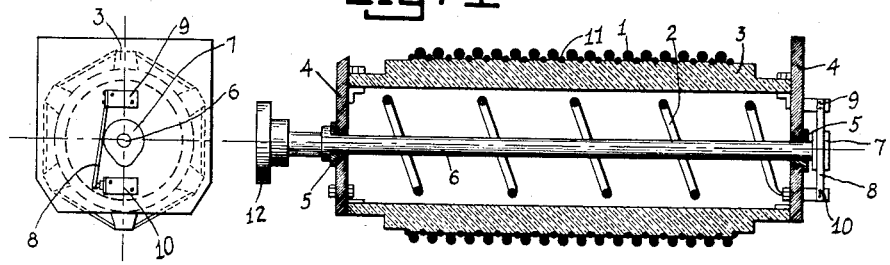
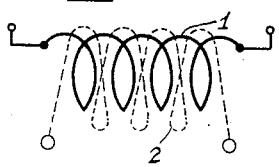
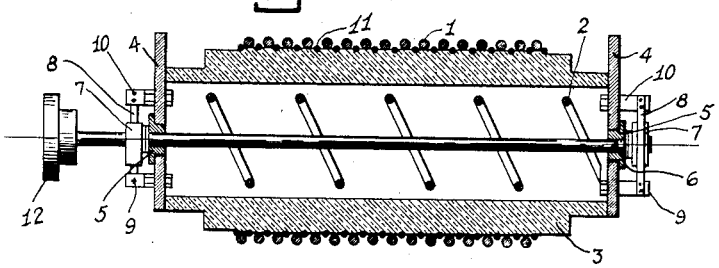
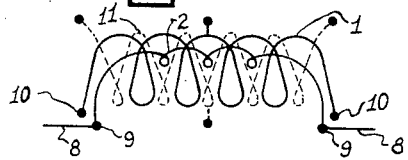
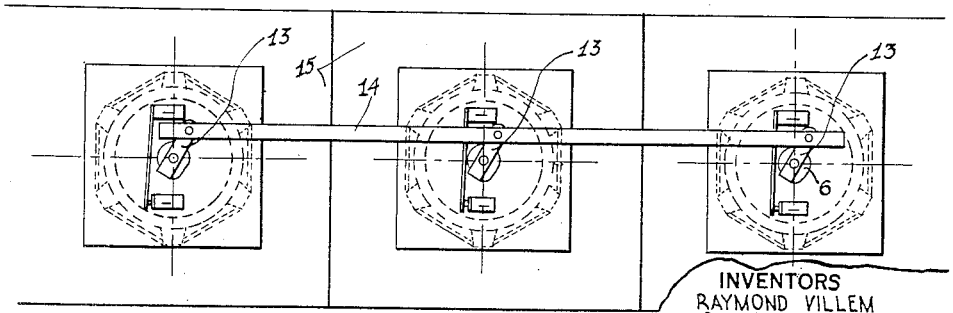
INVENTORS
RAYMOND VILLEM
ROGER AUBERT
BY
ATTORNEY Patented Mar. 17, 1936

2,034,012

UNITED STATES PATENT OFFICE 2,034,012

RADIOELECTRIC TRANSMITTER AND RECEIVER SYSTEM WITH CHANGEABLE WAVE-LENGTH RANGE

Raymond Villem and Roger Aubert, Paris, France, assignors to Compagnie Generale de-Telegraphic Sans Fil, a corporation of France Application June 3, 1932, Serial No. 615,132
In France November 30, 1931

3 Claims. (Cl. 171—242)

This invention relates to a device adapted to insure a change in the wave-length of receivers and transmitters.

According to the prior art, in order to insure this action, it has been suggested to modify the constituent elements of the oscillation circuit either by changing the capacity or else the inductance, or else by acting upon the latter by means of taps or short-circuiting of spires or turns with a view to thus alter the active part.

Now, all of these solutions involve the inconvenience that the outfit is increased with attendant larger space requirements or that additional losses are occasioned in the circuits (inductance vibrating at free end, induced currents flowing through the short-circuited spires), or that they increase the natural wave-length of the circuit.

The system forming the object of this invention has as its chief purpose the obviation of the said drawbacks which tend to frustrate all attempts at designing amplifiers efficient particularly at ultra-high frequencies such as are involved in short-wave work. It is known from actual practice that the construction of devices involving interchangeable inductance coils is attended with very serious difficulties in short-wave work. Indeed, quite apart from the fact that it is well-nigh impossible to preserve under such conditions a stable calibration of the circuits as a result of the marked consequences brought about even by slight deformations of the conductors or their supporting means while the different inductance coils are plugged out and in, the change is very hard in service especially when it has to be effected in more than one stage.

The principle underlying the arrangement consists in shunting the inductance of the circuit which is used in the range comprising the higher wave by means of an inductance disposed interiorly of the former so as to insure another wave-length range.

The two inductances have preferably the same length so that, at any instant, the potentials of the spires or turns with respect to the one or the other winding should as far as feasible have sensibly equal values when the two inductance coils are in parallel and as a result operate on the shortest waves. The losses then occasioned in the supports will be of minimum value.

It has been ascertained that with such a system tuned for waves between 15 and 60 meters the overvoltage obtained is very sensibly the same as if, for insuring the same range, there were provided two simple movable (removable) inductance coils, each having the same size or occupying the same space.

Although the system could be integrally applied to circuits furnished with screen-grid tubes, it has also been discovered that for neutrodyne triodes, it insures the same neutrodyne value for both wave-length ranges. This result is due to the distribution of the potentials outside the twin inductance coil, in fact this distribution stays the same for both wave-length ranges.

The invention will be more clearly understood by reference to the attached drawings which by way of example illustrates certain embodiments of the invention.

Fig. 1 represents by way of example a twin-type inductance coil incorporating the basic idea of this invention, in case of non-symmetric stages. Fig. 1A is an end elevation of Fig. 1. Fig. 2 is a schematic wiring diagram. Fig. 3 represents a modification for a case of symmetric amplication stages. Fig. 4 represents a schematic wiring diagram covering the preceding arrangement. Fig. 5 shows a unicontrol scheme of three inductances of the kind here in question. Fig. 6 shows a circuit diagram of this invention including an oscillator and two stages of amplification with a uni-control switching arrangement.

Referring to the drawings it will be seen that the exterior winding 1 is supported by a support 3 consisting of low-loss insulation material, and the inner winding 2 consisting of rigid wire is disposed in the interior of the insulating support 3. At both ends of the support insulating end members 4 support bearings 5 in which turns a shaft 6. The latter has at one end the control knob 12 and at the opposite end an insulating cam 7. The latter controls an elastic (spring) blade or leaf 8 adapted to make and break the contact between the contacts 9 and 10 thus insuring either the disconnection from or the connection in parallel with the exterior inductance coil.

A coupling winding 11 may be disposed on the insulating support and wound between the spires of the external winding.

It will be seen that the arrangement here used is adapted to insure a (potential or voltage) coupling that is practically constant for both wave-length ranges, the exterior inductance in this case withstanding (or being acted upon by) the aggregate radio frequency potential difference.

Shaft 6 may be connected with the mass (ground) whereby all capacity actions upon the control knob 12 are excluded.

Since the cam 7 does not make contact with the spring blade 8 in the "short-wave" position the insulating material from which it is made for this wave-length range will not give cause to any additional loss.

In Fig. 3 which, as has been pointed out illustrates an arrangement suitable for symmetric circuits, the shaft 6 bears two cams 7. These control two blades of an elastic kind 8 which are designed to break the two ends of the inner winding. A schematic view thereof is shown in Fig. 4.

The control or drive shaft or spindle need no longer be grounded because of the fact that symmetric conditions are present; it is at zero potential and its operation by the agency of the button 12 does not result in any capacitive effects.

It will be understood that the adoption of Fig. 3 may be useful in a non-symmetric stage whenever the inner winding is to be insulated entirely from the outside winding.

To insure high-speed operation in changing the wave-length ranges all of the shafts or spindles 6 of the various stages may be united mechanically and be operated by one and the same control means.

Fig. 5 by way of example shows one embodiment of such an arrangement comprising three oscillation circuits. The three spindles 6 are fixedly united with three cranks 13 simultaneously controlled by a rod 14.

It will be sufficient to cause rotation of a single one of the spindles 6 or to act directly upon the rod 14 so as to secure simultaneously the change in wave-length range of the three circuits being separated by shielding 15.

What is claimed is:

1. In a radio-electric apparatus operating on several wave-length ranges, means adapted to change the wave-length ranges comprising an insulating hollow body, an inductance coil wrapped about said body and connected in the circuit of said apparatus with a view to insure operation on a longer wave-length range, a second inductance in the form of a rigid wire arranged interiorly of said insulator body, and means to connect the two inductances in parallel relation so as to secure operation of the apparatus upon shorter wave-length ranges, said means comprising two terminals connected respectively with each of the two inductances, elastic means uniting the two terminals in the absence of an external force, and means to exercise this external force upon the elastic means with a view to break the connection between the two terminals, these means being driven by a shaft passing through the interior of the insulating body, and operating means to drive said shaft.

2. In a radio-electric apparatus operating on several wave-length ranges, means adapted to change the wave-length ranges comprising an insulating hollow body, an inductance coil wrapped about said body and connected in the circuit of said apparatus with a view to insure operation on a longer wave-length range, a second inductance in the form of a rigid wire arranged interiorly of said insulator body, and means to connect the two inductances in parallel relation so as to secure operation of the apparatus upon shorter wave-length ranges, said means comprising two terminals connected respectively with each of the two inductances, elastic means uniting the two terminals in the absence of an external force, and means to exercise this external force upon the elastic means with a view to break the connection between the two terminals, these means being driven by a shaft having a bearing at each end of the coil, said shaft passing through the interior of the insulating body, and operating means to drive said shaft.

3. In a radio-electric apparatus operating on several wave-length ranges, means adapted to change the wave length ranges comprising an insulating hollow body, an inductance coil wrapped about said body and connected in the circuit of said apparatus with a view to insure operation on a longer wave-length range, a second inductance in the form of a rigid wire arranged interiorly of said insulator body, and means to connect the two inductances in parallel relation so as to secure operation of the apparatus upon shorter wave-length ranges, said means comprising two terminals connected respectively with each of the two inductances, elastic means uniting the two terminals in the absence of an external force, and means to exercise this external force upon the elastic means comprising a cam cooperating with switch contacts, with a view to break the connection between the two terminals, these means being driven by a shaft having a bearing at each end of the coil, said shaft passing through the interior of the insulating body, and operating means to drive said shaft.

RAYMOND VILLEM.
ROGER AUBERT.